(12) United States Patent
Raglin

(10) Patent No.: US 10,570,721 B1
(45) Date of Patent: Feb. 25, 2020

(54) GAS BYPASS SEPARATOR

(71) Applicant: WellWorx Energy Solutions LLC, Horseshoe Bay, TX (US)

(72) Inventor: John M. Raglin, Fredericksburg, TX (US)

(73) Assignee: WellWorx Energy Solutions LLC, Horseshoe Bay, TX (US)

( * ) Notice: Subject to any disclaimer, the term of this patent is extended or adjusted under 35 U.S.C. 154(b) by 0 days.

(21) Appl. No.: 16/293,244

(22) Filed: Mar. 5, 2019

(51) Int. Cl.
*B01D 19/00* (2006.01)
*E21B 43/38* (2006.01)
*E21B 43/12* (2006.01)

(52) U.S. Cl.
CPC .......... *E21B 43/38* (2013.01); *B01D 19/0042* (2013.01); *E21B 43/128* (2013.01)

(58) Field of Classification Search
None
See application file for complete search history.

(56) References Cited

U.S. PATENT DOCUMENTS

| | | | | |
|---|---|---|---|---|
| 2,242,166 | A * | 5/1941 | Bennett | E21B 43/128 166/105 |
| 6,598,681 | B1 * | 7/2003 | Berry | E21B 43/128 166/105 |
| 8,448,699 | B2 * | 5/2013 | Camilleri | E21B 43/128 166/369 |
| 8,955,598 | B2 * | 2/2015 | Brown | E21B 43/121 166/105.5 |
| 9,004,166 | B2 | 4/2015 | Raglin | |
| 9,771,786 | B2 | 9/2017 | Raglin | |
| 10,119,383 | B2 * | 11/2018 | Mazzanti | E21B 43/38 |

* cited by examiner

*Primary Examiner* — Amber R Orlando
*Assistant Examiner* — Phillip Y Shao
(74) *Attorney, Agent, or Firm* — Frost Brown Todd LLC

(57) ABSTRACT

A separator for separating gas from a liquid mixture in a production stream of a well. The separator includes an outer tube and an inner tube positioned concentrically with the outer tube. The production stream is directed through the outer tube where gas in the production stream can separate from liquid in the production stream. The separated liquid is then directed through the inner tube to a pump. The separated gas is directed through a gas bypass to an area above a fluid intake for the pump.

12 Claims, 5 Drawing Sheets

GAS BYPASS SEPARATOR

TECHNICAL FIELD

The present disclosure is directed to an apparatus and method for petroleum producing and injection wells and more particularly to the separation of gas and liquid from a hydrocarbon production stream.

BACKGROUND OF THE INVENTION

Petroleum wells can be naturally flowing, injecting or can be produced by any means of artificial lift. Such artificial lift in a production well may be produced by, but is not limited to, an electrical submersible pump (ESP), a sucker rod pump, and/or a progressing cavity pump. For instance, an ESP system may include an electric motor and a pump that is used to pump oil or other liquids within a wellbore. The electric motor may have a rotatable rotor that is contained in a stationary stator. When the motor operates, the rotor may rotate to provide artificial lift within the wellbore.

Referring to FIG. 1, a diagram of a typical ESP system (100) includes a centrifugal pump (101), a pump motor (105), and a seal assembly (103) located between the pump (101) and motor (105). The pump (101), seal assembly (103), and motor (105) are located within a borehole (121), inside a standard well casing (123). The ESP system (100) further includes a variable speed drive (111), a controller (113), and an optional transformer (115) located on the surface (125). A three-phase power cable (117) provides power and communications between the variable speed drive (111) (or optional transformer (115)) and the pump motor (105). The variable speed drive (111) can operate as a power source by providing electrical power for driving the motor (105). The cable (117) typically extends thousands of feet and thereby introduces significant electrical impedance between the variable speed drive (111) (or optional transformer (115)) and the pump motor (105). By altering the output voltage and frequency of the variable speed drive (111), the controller (113) associated with the variable speed drive (111) controls the voltage at motor (105) terminals, and thus the operation of the pump.

As can be seen from FIG. 1, where the product flowing into the well bore contains entrained and free gas, that gas can enter the pump and reduce the volumetric efficiency of the pump. For instance, the hydrocarbon production stream can include both liquid and gaseous products that are a natural byproduct of the producing wells. As hydrocarbons and water flow through the formation, gases can travel in the flow stream either separate from the liquid products or dissolved within the liquid products. The gases are carried into the production tubing and can cause problems for an artificial lifting mechanism, such as ESP systems, by reducing the volumetric efficiency of the pump.

Gas interference occurs in situations when the pump is filling with a considerable amount of free gas that is not separated before entering the pump. If the amount of free gas entering the pump can be reduced, the volumetric efficiency of the pump can be improved, or the total pump capacity can be increased.

BRIEF SUMMARY OF THE INVENTION

An exemplary gas bypass separator for at least partially separating a well product into a well gas and a well liquid within a well bore may comprise: an outer tube defining an outer conduit extending from a lower end to an upper end of the outer tube, wherein the outer tube comprises a plurality of openings extending along a length of the outer tube from the outer conduit to an exterior of the outer tube, wherein the plurality of openings is configured to allow the well liquid to flow downward inside the outer tube and well gas to flow upward in the well bore and inside the outer tube; an upper tube coupled with the upper end of the outer tube, wherein the upper tube defines an upper conduit extending from a lower end to an upper end of the upper tube, wherein the upper conduit is configured to receive a liquid separated from the liquid and gas mixture; and a gas bypass extending along the upper tube, wherein the gas bypass comprises a bottom opening at a lower portion of the upper tube, wherein the gas bypass comprises a top opening outside of the upper tube, wherein the gas bypass is configured to receive the separated gas through the bottom opening, wherein the gas bypass is configured to discharge the separated gas at the top opening.

An exemplary gas bypass separator assembly for use within a well bore may comprise: a casing defining an annulus; a packer disposed within the annulus of the casing, wherein a portion of the packer is positioned adjacent to an interior surface of the casing; and a separator disposed within the annulus of the casing. The separator may comprise: an outer tube defining an outer conduit extending from a lower end to an upper end of the outer tube, wherein the outer tube comprises a plurality of openings extending along a length of the outer tube from the outer conduit to an exterior of the outer tube, wherein the plurality of openings is configured to separate at least a portion of a gas from a liquid and gas mixture; an upper tube coupled with the upper end of the outer tube, wherein the upper tube defines an upper conduit extending from a lower end to an upper end of the upper tube, wherein the upper conduit is configured to receive a liquid separated from the liquid and gas mixture; and a gas bypass extending along the upper tube through the packer, wherein the gas bypass comprises a bottom opening positioned below the packer, wherein the gas bypass comprises a top opening positioned above the packer outside of the upper tube, wherein the gas bypass is configured to receive the separated gas through the bottom opening, wherein the gas bypass is configured to discharge the separated gas at the top opening.

An exemplary method for separating gas from liquid in a production stream in a well casing may comprise: separating gas from a gas and liquid production stream in the well casing by directing a flow of the liquid downward in a tube causing the separation as the gas flows upward; directing the separated gas into a gas bypass; discharging the separated gas to an area above a fluid intake of an artificial lift; and directing the separated liquid to the artificial lift.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Preferred embodiments of a gas bypass separator for a hydrocarbon producing well provides mechanisms for both reducing the amount of gas entrained in a liquid product, including oil and/or water, and separating that free gas from the liquid product. The mechanism uses a packer type separator to create an artificial sump for the pump. Any type of artificial lift applicable to any producing oil well may be used, such as a sucker rod pump, rod pumping, electric submersible pumps, progressive cavity, and other methods.

Figure 1:
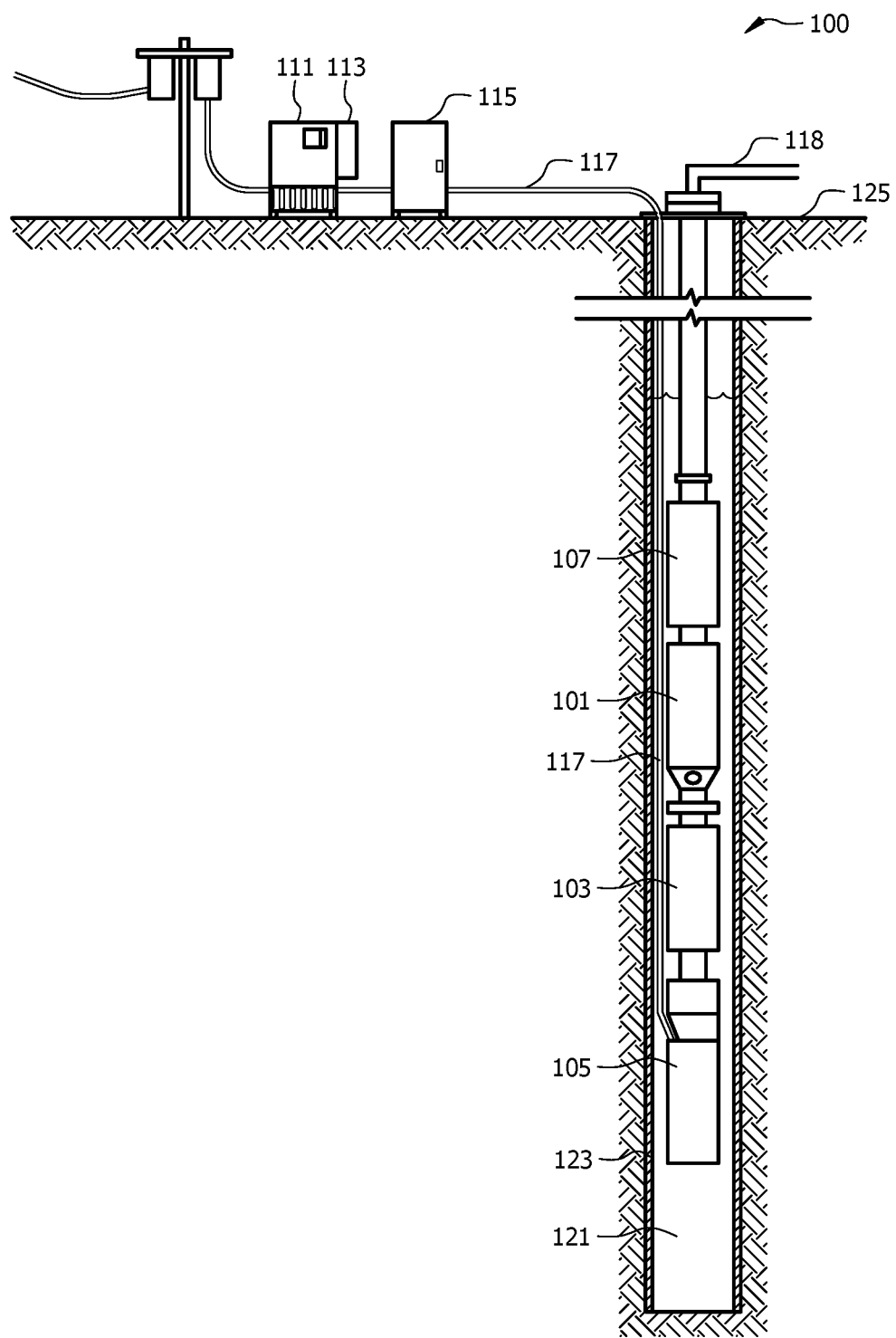
FIG. 1 depicts a diagram of a prior art petroleum producing well showing an existing electrical submersible pump system to provide artificial lift.
Figure 2:
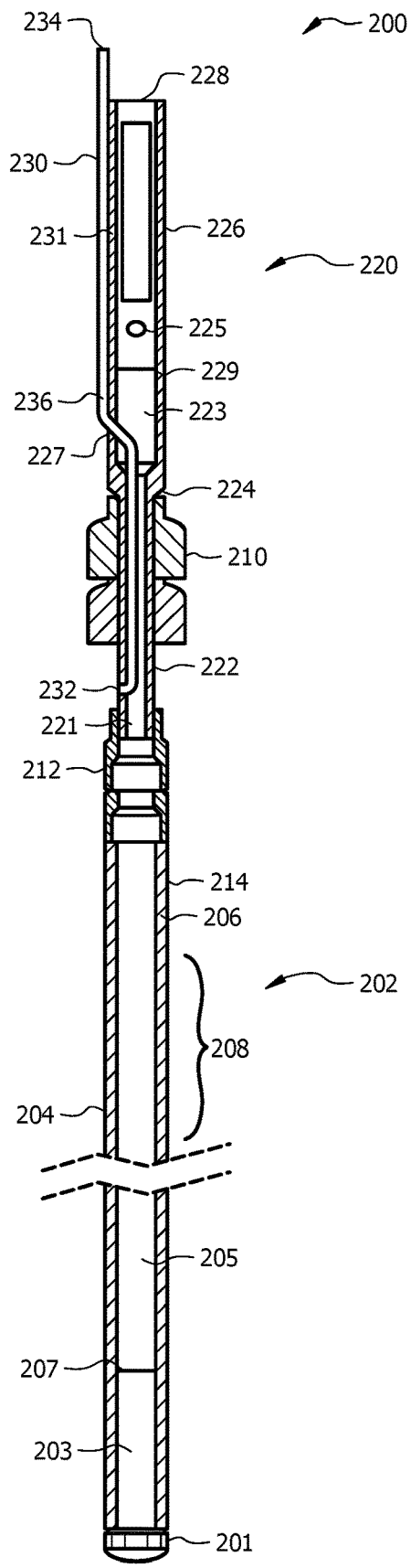
FIG. 2 depicts a cross-sectional view of an exemplary gas bypass separator for use within a petroleum producing well.
Figure 3:
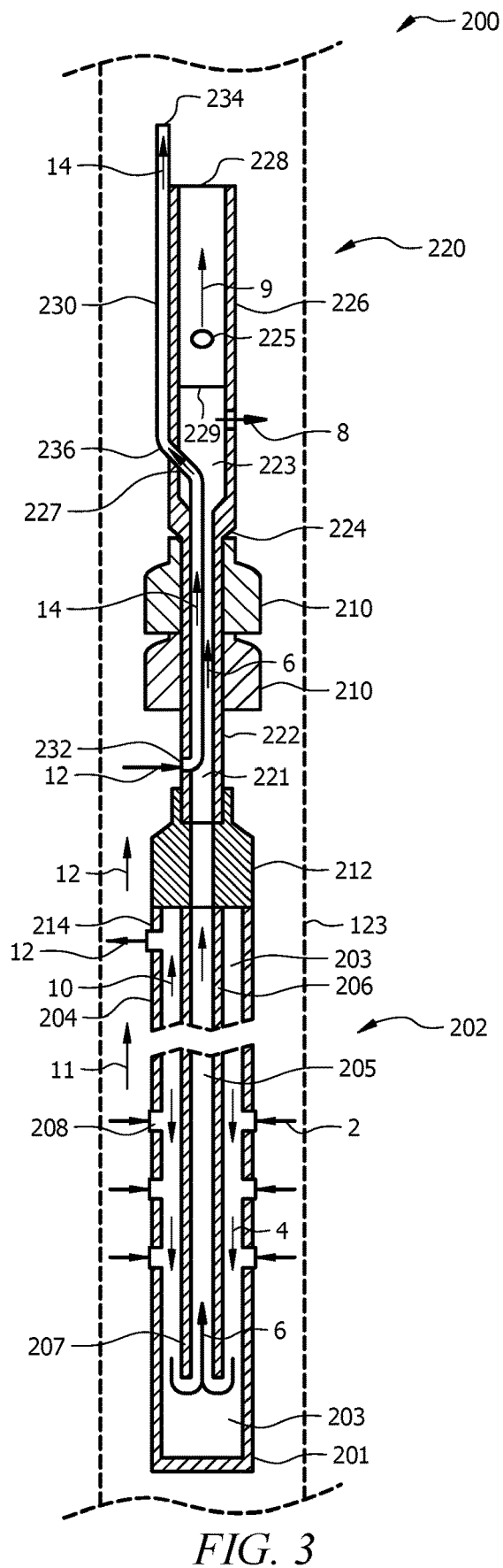
FIG. 3 depicts a detail view of the flow path of the separator in FIG. 2.

Referring now to FIGS. 2-3, an embodiment of a gas bypass separator (200) according to the concepts described herein is shown for use in a hydrocarbon producing well. For instance, the separator (200) may be positioned within a well casing (123), as shown in FIG. 1, below an artificial lift, such as an ESP system (100), to separate gas within the wellbore before the gas reaches the artificial lift. As shown in FIG. 2, the separator (200) comprises a lower portion (202) and an upper portion (220) positioned above the lower portion (202). The lower portion (202) comprises an outer tube (204) and an inner tube (206) positioned concentrically within the outer tube (204). The outer tube (204) defines a conduit (203) extending longitudinally through the outer tube (204) and the inner tube (206) defines a conduit (205) extending longitudinally through the inner tube (206). The outer and inner tube (204, 206) each have a generally cylindrical body, but any other suitable shapes may be used (e.g., square, hexagonal, octagonal, etc.). The outer tube (204) has a larger length than the inner tube (206) such that the outer tube (204) extends beyond a bottom end (207) of the inner tube (206). For instance, the outer tube (204) may have a length of about 40 feet and an outer diameter of about 3½ feet, though other suitable dimensions may be used. The inner tube (206) may have a corresponding length of about 39 feet and an outer diameter of about 2⅜ feet, though any other suitable dimensions may be used.

A bottom end of the outer tube (204) may be plugged with a cap (201). A sidewall of the outer tube (204) comprises a plurality of openings (208) or slots extending from the conduit (203) of the outer tube (204) to the exterior of the outer tube (204). Accordingly, the openings (208) may allow a mixture of liquid and gas from the well casing (123) into the conduit (203) of the outer tube (204). The openings (208) are positioned along a portion of the length of the outer tube (204). For instance, the openings (208) may be positioned about 5 feet from a bottom end of the outer tube (204) and extend for a length of about 6 feet along the outer tube (204), though other suitable dimensions may be used. In some versions, the openings (208) may be graduated such that the openings (208) towards a bottom portion of the outer tube (204) may be larger than the openings (208) extending upward along the outer tube (204). For instance, the opening (208) at the bottom portion of the outer tube (204) may have a diameter of about ¾ inches and the openings (208) towards a top portion of the outer tube (204) may have a diameter of about ¼ inches, but any other suitable dimensions may be used. In other versions the pattern may be reversed with the smaller openings at the bottom portion and increasing in size extending toward the top along outer tube (204). In yet other versions, the largest openings may be in the middle and decrease in size as they extend toward the bottom and top of outer tube (204). The openings (208) may be aligned longitudinally along the outer tube (204), or in a helical pattern along the outer tube (204). The openings (208) may therefore equalize a velocity of the liquid and gas mixture into the conduit (203) of the outer tube (204) across the span of the openings (208). Still other suitable configurations for allowing the liquid and gas mixture to enter the separator (200) will be apparent to one with ordinary skill in the art in view of the teachings herein.

A top portion of the outer tube (204) comprises a bleeder opening (214) extending from the conduit (203) of the outer tube (204) to an exterior of the outer tube (204). This bleeder opening (214) may thereby allow gas to escape from the conduit (203) of the outer tube (204). The bleeder opening (214) may have a diameter of about ¾ inches, though other suitable dimensions may be used. The top portion of the outer tube (204) and inner tube (206) are then coupled with the upper portion (220) of the separator (200) via a coupling (212). It should be noted that this coupling is merely optional such that in some versions the lower portion (202) of the separator (200) is directly coupled to the upper portion (220) of the separator (200).

The upper portion (220) of the separator (200) comprises an upper tube (222) extending upward from the coupling (212) longitudinally with the lower portion (202) of the separator (200). The upper tube (222) defines a conduit (221) extending longitudinally through the upper tube (222). As the upper tube (222) extends upward, the upper tube (222) comprises a bell portion (224) having a tapered wall extending outwardly. The conduit (221) of the upper tube (222) thereby widens at the bell portion (224) to form a wider portion (226) of the upper tube (222) such that the wider portion (226) defines another conduit (223) above the bell portion (224) having a larger diameter. The wider portion (226) of the upper tube (222) further comprises a flange (229) extending within the conduit (223) of the upper tube (222) to block a flow path through the upper tube (222). The upper tube (222) defines at least one opening (227), allowing fluid within the conduit (223) of the upper tube (222) to flow out of the upper tube (222) and into the well casing (123) below the flange (229). A pump intake opening (225) is then provided in the upper tube (222) above the flange (229). The pump intake opening (225) extends from the conduit (223) to an exterior of the upper tube (222). This may allow liquid in the well casing (123) to re-enter the conduit (223). This conduit (223) then extends upward to a top end (228) of the upper tube (222). The top end (228) may be coupled to a motor (105) of the ESP system (100) via tooling to deliver liquid to the ESP system (100). The upper tube (222) defines a generally cylindrical shape, but any other suitable shapes may be used (e.g., square, hexagonal, octagonal, etc.).

As shown in FIG. 2, the upper tube (222) comprises a gas bypass (230) extending through the upper tube (222). For instance, the bottom portion of the upper tube (222) comprises an opening (232) of the gas bypass (232). The gas bypass (232) then extends upward within the conduit (221) of the upper tube (222) through a packer assembly (210). As shown, the packer assembly (210) comprises a plurality of divertor cups extending outwardly from a body of the packer assembly (210). These cups may be positioned against an interior surface of a well casing (123). The cups of the packer assembly (210) may thereby reduce or prevent any material from flowing up the casing or leaking around the exterior surface of the packer assembly (210), thereby forcing the well product (liquid and gas) to pass through the tool. While two cups are shown, any other suitable number of cups may be used with the packer assembly (210), such as four. Further, any other suitable type of packer assembly (210) may be used, such as a dual-completion packer.

Once the gas bypass (230) has extended through the packer assembly (210) and bell portion (224) of the upper tube (222), the gas bypass (230) may be directed from the conduit (223) of the wider portion (226) of the upper tube (222), through an opening (227) in the upper tube (222), to an exterior surface of the upper tube (222) at a bent portion (236) of the gas bypass (230). The gas bypass (230) may then extend upward to an open end (234) of the gas bypass positioned above a pump intake opening (225) for the artificial lift. While preferred versions of gas bypass separator (200) run gas bypass tube (230) through upper tube (222) and conduit (223), other routings for gas bypass (230) are within the scope of the concepts described herein. For example, gas bypass (230) can be routed straight up the outside of upper tube (222) and conduit (223) through a modified packer assembly that has an aperture for gas bypass tube (230) while maintaining its functionality. The gas bypass (230) may be made from steel tubing, though other suitable materials may be used. The gas bypass (232) may have a diameter of about ½ inch and a length of between about 20 feet and about 500 feet, though other suitable materials and/or dimensions may be used. The gas bypass (232) may be banded with an electrical cable of the ESP system (100).

Referring to FIG. 3, the separator (200) may be placed in the well casing (123), below an artificial lift or ESP system (100), to separate gas within the wellbore before the gas reaches the artificial lift or ESP system (100). For instance, when an artificial lift is created in the wellbore, such as by the ESP system (100), a liquid and gas mixture at a bottom portion of the well casing (123) may enter the outer tube (204) of the separator (200) through the plurality of openings (208), as shown by arrows (2). The turbulence created within the liquid and gas mixture as the mixture enters the separator (200) through the plurality of openings (208) may cause the gas particles of the mixture to separate from the liquid particles of the mixture. The separated gas may thereby naturally travel upward within the conduit (203) of the outer tube (204) about the inner tube (206), as shown by arrows (10), or the separated gas may separate outside of the outer tube (204) and naturally travel upward within the well casing (123) outside of the outer tube (204), as shown by arrows (11). The separated liquid may travel downward within the conduit (203) of the outer tube (204) about the inner tube (206), as shown by arrows (4). When the liquid reaches the bottom end (207) of the inner tube (206), the liquid may be redirected upward within the conduit (205) of the inner tube (206), as shown by arrows (6). This redirection may also cause some remaining gas within the liquid to separate from the liquid.

The separated liquid thereby travels up the conduit (205) of the inner tube (206) to the conduit (221) of the upper tube (222). As the separated liquid passes through the bell portion (224) of the upper tube (222), the velocity of the separated liquid may decrease as it flows from the smaller diameter of conduit (221) to the larger diameter of conduit (223). In some versions, some or all of the liquid within conduit (223) is blocked by flange (229) such that the liquid exits the conduit (223) through opening (227) within the wider portion (226) of the upper tube (222) below the flange (229), as shown by arrow (8). The liquid may thereby provide cooling within the well casing (123) above the packer assembly (210). Some or all of the liquid in the well casing (123) above the packer assembly (210) may enter conduit (223) of the upper tube (222) through the pump intake opening (225). The liquid within the upper tube (222) may then be directed through the top end (228) of the separator (200) to the artificial lift or ESP system (100), as shown by arrow (9).

The separated gas may travel upward to the opening (232) of the gas bypass (230) via two flow paths. First, gas separated in the well casing (123) as fluid enters the outer tube (204) rises within the well casing (123), but is trapped by the packer assembly (210) thereby creating a gas build up below the packer assembly (210). Second, gas separated within the outer tube (204) flows upward between the outer tube (204) and the inner tube (206) to bleeder opening (214), where the gas exits the outer tube (204) and re-enters the well casing (123) to join the gas in the well casing (123) below the packer assembly (210). The separated gas in the well casing (123) may thereby flow through into the gas bypass (230) through opening (232), as shown by arrow (12). The gas bypass (232) may direct the gas through the packer assembly (210) within the conduit (221) of the upper tube (222), as shown by arrows (14). The gas bypass (232) is then directed outside of the upper tube (222), where the gas bypass (232) may discharge the separated gas through the top end (234) of the gas bypass (232) above the pump intake opening (225). The separated gas may thereby discharge through the well casing (123) to the production surface equipment. The gas bypass (232) thereby prevents the separated gas from entering the artificial lift or ESP system (100) to improve the efficiency and/or life of the ESP system (100). If a portion of liquid enters the gas bypass (232), the liquid may exit the gas bypass (232) and fall back toward the packer assembly (210) and the pump intake opening (225). Still other suitable configurations for separating gas from liquid in a well bore will be apparent to one with ordinary skill in the art in view of the teachings herein.

Figure 4:
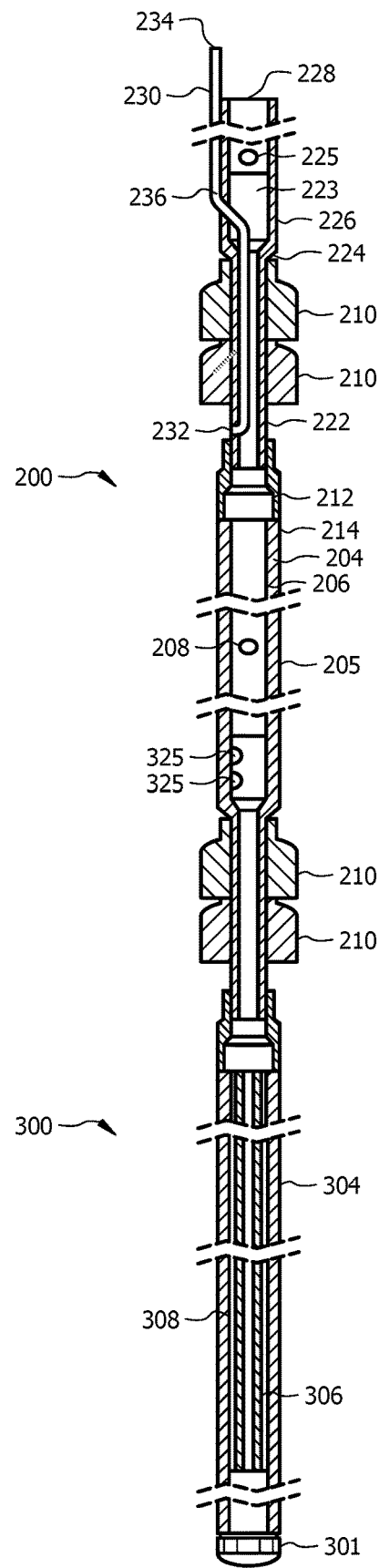
FIG. 4 depicts a cross-sectional view of the separator of FIG. 2 assembled with a solid separator.

In some versions, the gas bypass separator (200) may be assembled with a solid separator (300), as shown in FIG. 4. For instance, the solid separator (300) may be coupled with the gas bypass separator (200) below the gas bypass separator (200) such that the solid separator (300) is operable to separate solid particulates, such as sand, silt, and other natural byproducts of the well, from the production stream before the solid particulates reach the ESP system (100). Such particulates can reduce the lift of the downhole assembly and increase maintenance cost.

Accordingly, a gas, liquid, and solid mixture can enter the solid separator (300) and travel downward through an outer tube (304) of the solid separator (300) to a helix (308). The helix (308) may spin out the solid particulates from the gas, liquid, and solid mixture to separate the solid particulates from the mixture. The separated solid particulates may thereby fall and collect within a bottom (301) of the outer tube (304) of the solid separator (300). The remaining gas and liquid mixture may then be redirected to travel upward within an inner tube (306) of the solid separator. The gas and liquid mixture can exit the solid separator (300) through openings (325) at a top portion of the solid separator (300) and enter the gas bypass separator (200) through openings (208). As discussed above, the gas bypass separator (200) can separate the gas from the liquid, to deliver the liquid to the artificial lift or ESP system (100).

Figure 5:
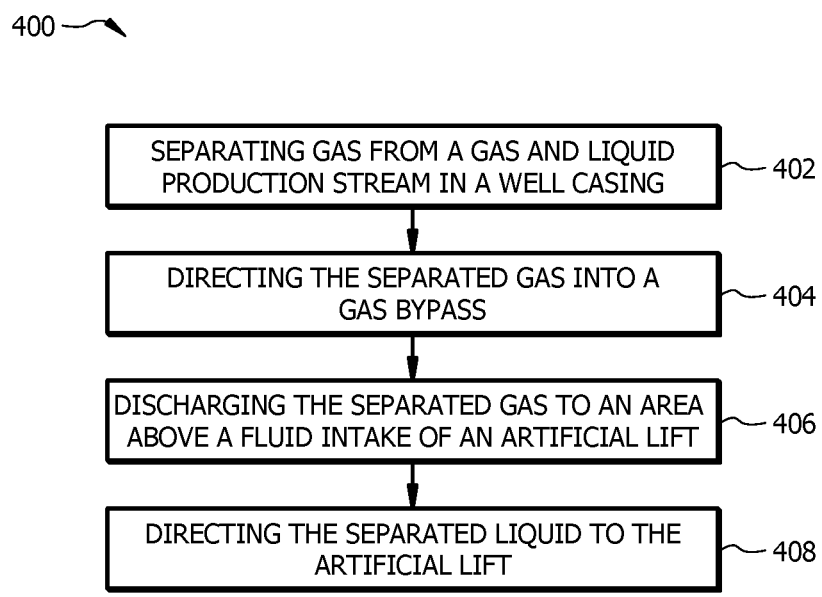
FIG. 5 depicts a flow diagram of an exemplary method of separating gas within a petroleum producing well.

Accordingly, a method (400) for separating gas from a production stream is shown in FIG. 5. The method (400) comprises the step (402) of separating gas from a gas and liquid production stream in a well casing. This may be performed by the gas bypass separator (200), as discussed above, when the liquid and gas mixture enters the separator (200) through the openings (208). The separated gas may then be directed into the gas bypass separator (230) of separator (200), as shown in step (404). The gas bypass (230) may discharge the separated gas to an area above a fluid intake (225) of an artificial lift, as shown in step (406). The separated liquid within the separator (200) may then be directed, such as by the upper tube (222), to the artificial lift, or ESP system (100), as shown in step (408).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A separator for at least partially separating a well product having a liquid and gas mixture into a well gas and a well liquid within a well bore, the separator comprising:
    an outer tube defining an outer conduit extending from a lower end to an upper end of the outer tube, wherein the outer tube comprises a plurality of openings extending along a length of the outer tube from the outer conduit to an exterior of the outer tube, wherein the plurality of openings is configured to allow the well liquid to flow downward inside the outer tube and well gas to flow upward in the well bore and inside the outer tube;
    an upper tube coupled with the upper end of the outer tube, wherein the upper tube defines an upper conduit extending from a lower end to an upper end of the upper tube, wherein the upper conduit is configured to receive the well liquid separated from the liquid and gas mixture; and
    a gas bypass extending along the upper tube, wherein the gas bypass comprises a bottom opening at a lower portion of the upper tube, wherein the gas bypass comprises a top opening outside of the upper tube, wherein the gas bypass is configured to receive the well gas separated from the liquid and gas mixture through the bottom opening, wherein the gas bypass is configured to discharge the well gas at the top opening.

2. The separator of claim 1, further comprising an inner tube positioned concentrically with the outer tube, wherein the inner tube defines an inner conduit extending from a lower end to an upper end of the inner tube.

3. The separator of claim 2, wherein the outer tube has a larger length than the inner tube.

4. The separator of claim 2, wherein the inner tube is configured to redirect the separated liquid upward through the inner conduit of the inner tube to the upper conduit of the upper tube.

5. The separator of claim 1, wherein the plurality of openings in the outer tube are graduated along the length of the outer tube such that the size of the plurality of openings change along the length of the outer tube from the lower end to the upper end of the outer tube.

6. The separator of claim 1, wherein a bottom portion of the gas bypass extends through the upper conduit of the upper tube, wherein the gas bypass comprises a portion extending through the upper tube such that a top portion of the gas bypass extends outside of the upper tube.

7. The separator of claim 1, wherein the bottom opening of the gas bypass is positioned below a packer assembly, wherein the top opening of the gas bypass is positioned above the packer assembly.

8. The separator of claim 1, wherein the upper tube comprises a fluid intake opening extending from the upper conduit to the exterior of the upper tube, wherein the fluid intake opening is positioned between the top and bottom opening of the gas bypass.

9. The separator of claim 1, wherein the outer tube comprises a bleeder opening extending from the outer conduit to the exterior of the outer tube at a top portion of the outer tube, wherein the bleeder opening is positioned below the bottom opening of the gas bypass, wherein the bleeder opening is configured to discharge separated gas from within the outer tube.

10. The separator of claim 1, wherein the upper tube comprises a bell portion extending outwardly such that an upper portion of the upper conduit has a larger diameter than a lower portion of the upper conduit.

11. The separator of claim 1, wherein the upper tube comprises an opening extending from the upper conduit to an exterior of the upper tube, wherein the opening is configured to discharge the separated liquid from the upper tube.

12. The separator of claim 1, wherein the upper tube is coupled to an artificial lift, wherein the upper tube is configured to discharge the separated liquid through the upper end of the upper tube to the artificial lift.

* * * * *